US008070598B1

(12) United States Patent
Guinn, Jr. et al.

(10) Patent No.: US 8,070,598 B1
(45) Date of Patent: Dec. 6, 2011

(54) PLAYER TRACKING SYSTEM

(75) Inventors: Robert Guinn, Jr., Henderson, NV (US); Patrick Schmit, Las Vegas, NV (US)

(73) Assignee: E-T-T, LLC, Las Vegas, NV (US)

( * ) Notice: Subject to any disclaimer, the term of this patent is extended or adjusted under 35 U.S.C. 154(b) by 1633 days.

(21) Appl. No.: 10/809,536

(22) Filed: Mar. 24, 2004

Related U.S. Application Data

(60) Provisional application No. 60/458,852, filed on Mar. 27, 2003.

(51) Int. Cl.
*G06F 17/30* (2006.01)
*A63F 9/24* (2006.01)

(52) U.S. Cl. ........................................ 463/29; 463/16

(58) Field of Classification Search .................... 705/14; 463/16, 29

See application file for complete search history.

(56) References Cited

U.S. PATENT DOCUMENTS

| | | | | |
|---|---|---|---|---|
| 5,761,647 | A | 6/1998 | Boushy | |
| 6,003,013 | A | 12/1999 | Boushy | |
| 6,183,362 | B1 | 2/2001 | Boushy | |
| 6,302,793 | B1 * | 10/2001 | Fertitta et al. | 463/25 |
| 6,612,928 | B1 * | 9/2003 | Bradford et al. | 463/29 |
| 7,052,391 | B1 * | 5/2006 | Luciano, Jr. | 463/3 |
| 2002/0111210 | A1 * | 8/2002 | Luciano et al. | 463/29 |
| 2003/0104865 | A1 * | 6/2003 | Itkis et al. | 463/39 |
| 2008/0051193 | A1 * | 2/2008 | Kaminkow et al. | 463/25 |

* cited by examiner

*Primary Examiner* — Donald Champagne
(74) *Attorney, Agent, or Firm* — Weide & Miller, Ltd.

(57) ABSTRACT

An embodiment of the invention includes an RF fob with an embedded identifier. The fob transmits a signal that is received by one of a plurality of games which recognizes the identifier and thus identifies the player who holds the fob. Several discrete remote gaming locations are connected to a central location where player information is stored and maintained. When a player scans his fob at a game at any remote location connected to the central location, the identifier is transmitted to the central location and player information is transmitted to the game. The player can begin play, accumulating points on his/her account reflective of his or her gaming activity. The player can also redeem points for cash at the game itself without third-party assistance.

35 Claims, 6 Drawing Sheets

PLAYER TRACKING SYSTEM

CROSS REFERENCE TO RELATED APPLICATIONS

This application claims the benefit of provisional Application No. 60/458,852 filed Mar. 27, 2003.

BACKGROUND

Casinos frequently implement player tracking systems to track the wagering history of players, to award points or "comps," (e.g., coupons for discounted meals, drinks, shows, rooms, etc.) based on the level of wagering, and to generally promote the casino by enticing players to return to the casino in order to accumulate more points and comps. Presently it is typical for a player to be issued a plastic card that has an embedded magnetic stripe on which a player identification number is encoded. The player inserts the card into a magnetic reading device located on slot machines or other games in the casino in order to identify the player during the time that the card is inserted in the reader. Some systems require the player to enter a PIN to identify themselves through a keypad. The readers are generally linked to a local computer system that records the gaming activity for each player that uses a card. Some systems link local systems so that information can be available at different locations, although these systems generally do not centralize the information, but instead maintain the information in a distributed fashion at each location.

Despite the widespread use of magnetic card systems for player tracking, these systems have several drawbacks. Card readers tend to require considerable maintenance because of the mechanical parts used in receiving and expelling cards. Cards also tend to get lost, primarily because players forget to take them when they leave a game. Finally, a player that just wants to quickly play a game is discouraged from using his or her magnetic card in that it takes time to use the card: the player has to take the card out of his/her wallet, insert the card, wait for the card to be accepted, enter a PIN, and finally begin play. Accordingly, an improved system is desirable.

SUMMARY

A player tracking system is described herein that utilizes an RF device to carry a player identification number instead of a magnetic stripe card. In general, a system and method in an embodiment of the invention includes a small plastic fob containing a radio frequency (RF) antenna and an embedded identifier. The fob transmits a signal that is received by one of a plurality of games or other interactive devices having associated circuitry installed which recognizes the identifier and thus identifies the player who holds the fob. Several discrete remote gaming locations are connected to a central location where player information is stored and maintained in a database. When a player scans his fob at a game at any remote location connected to the central location, the identifier is transmitted to the central location and the player information is transmitted to the game. The player can begin play; accumulating points on his/her account reflective of his or her gaming activity. Points are accumulated based on the level of wagering and/or winning, based on awards or marketing promotions, or by any other method determined by the gaming establishment. Comps can also be awarded and recorded in the player's account. Points, in some embodiments, have a monetary value, and the player can redeem points for cash at the game itself without third-party assistance.

Enrollment of players in a tracking system in an embodiment of the invention can also be accomplished at a gaming or other interactive device that is part of the system. In one embodiment, an enroll signal is entered at the device, typically by a button, and then a fob held by the individual is scanned. A PIN is entered by the individual and the identifier and PIN are transmitted to the central site.

Finally, a system in an embodiment of the invention generates a plurality of reports at the central site which are viewable at the remote sites. In some embodiments the reports are viewable over an internet connection. In one embodiment, one of the reports allows a user to view the activity of a player in real time.

By using an RF fob in some embodiments, there is less maintenance required for readers, a player can more quickly initiate play while accumulating points, and loss of fobs is lower than with magnetic cards, since the fobs are not inserted into a reader but kept on the player's person.

BRIEF DESCRIPTION OF THE DRAWINGS

The present invention is described with respect to particular exemplary embodiments thereof and reference is accordingly made to the drawings in which.

DETAILED DESCRIPTION

Figure 1:
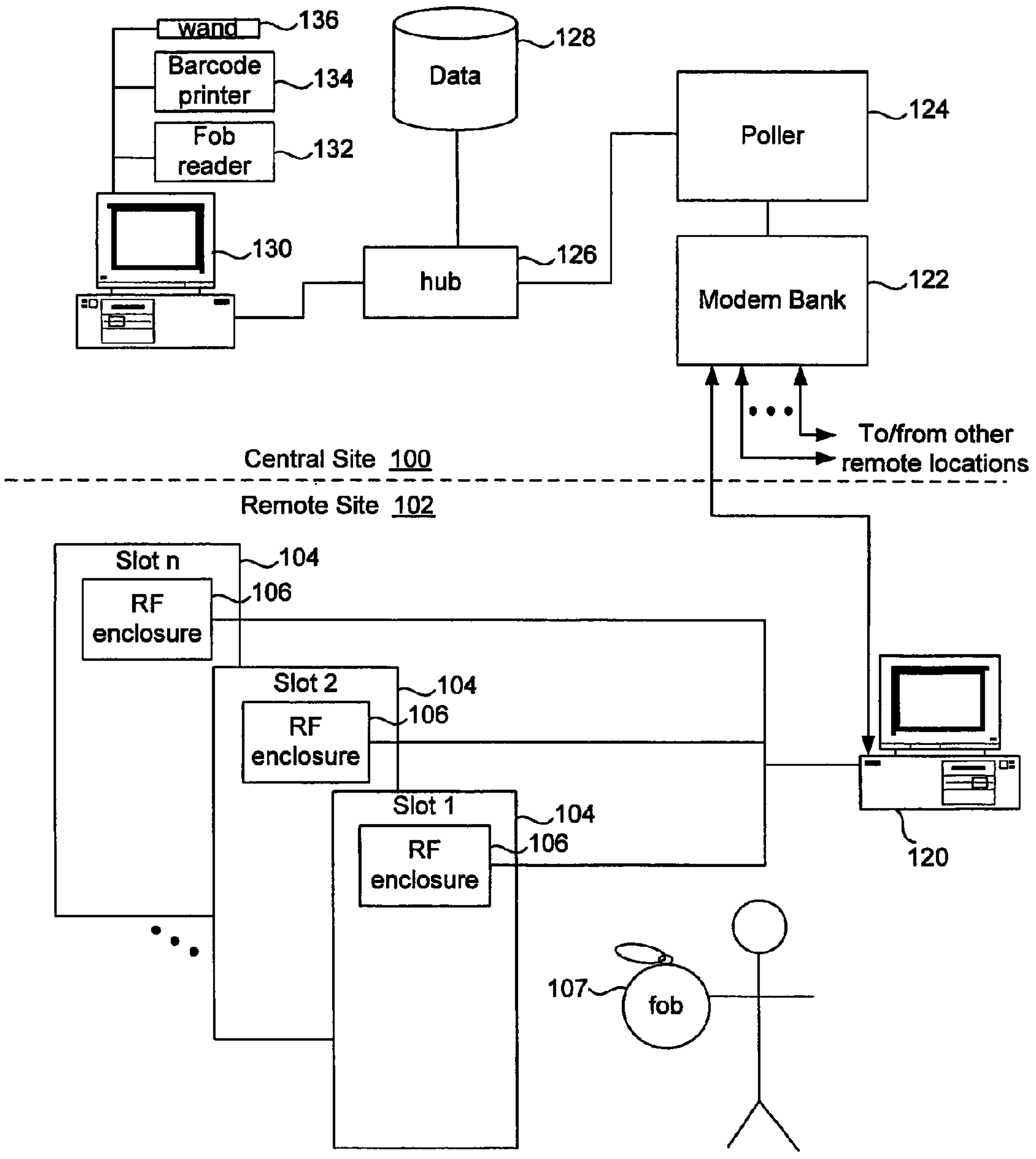
FIG. 1 is a generalized function block diagram of a system in an embodiment of the invention.

An embodiment in accordance with the invention is illustrated in FIG. 1 and spans at least two locations: central site 100 and remote site 102. Generally, remote site 102 will not be the same physical location as central site, although in some embodiments it can be. In addition, although not shown for simplicity of illustration, multiple remote sites are contemplated in various embodiments of the invention.

Figure 2:
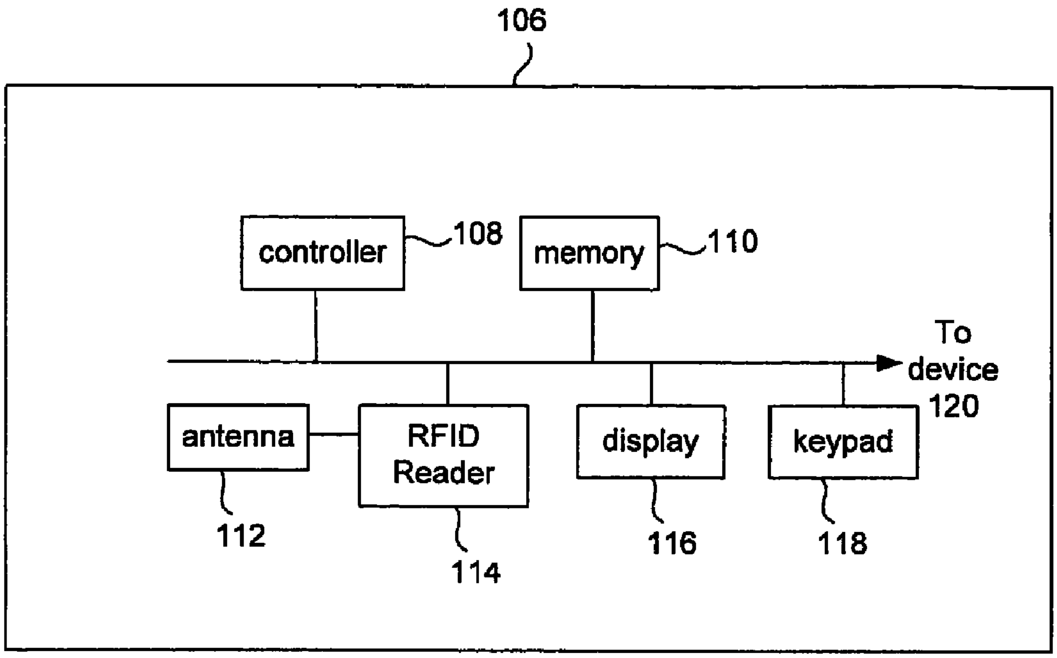
FIG. 2 is a generalized function block diagram of an RF enclosure in an embodiment of the invention.

Remote site 102 includes one or more slot machines 104, Slots 1 . . . *n*. An RF enclosure 106 is mounted on or otherwise coupled to each slot machine 104. Referring to FIG. 2, each RF enclosure 106 includes a controller 108, a memory 110, an antenna 112, an RF ID reader 114, a display 116, and a keypad 118. In one embodiment, the controller 108 and memory 110 are a single integrated structure, which in one embodiment is an ATMega128 or ATMega161, both available from Atmel of San Jose, Calif. RF ID reader 114 in one embodiment is Read/Write Base Station U2270B, also available from Atmel, which is coupled to antenna 112, sometimes referred to as a "coil." Although display 116 and keypad 118 are shown separately in FIG. 2, they can be embodied in an integrated unit, such as a touch screen.

Figure 3:
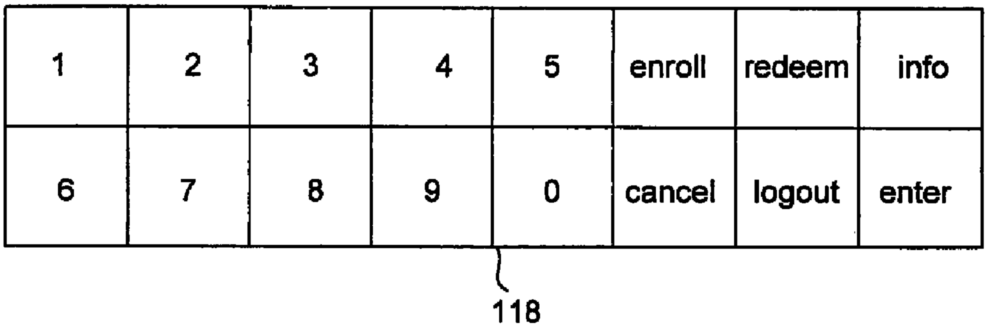
FIG. 3 is an exemplary keypad in an embodiment of the invention.

FIG. 3 illustrates a keypad 118 in one embodiment of the invention. As illustrated, keypad includes ten number keys, along with keys entitled "enroll," "redeem," "info," "cancel," "logout," and "enter."

Referring again to FIG. 1, RF enclosure 106 is designed to interact with individual fobs 107 held by individual players. In one embodiment, each fob is approximately 40 mm in diameter and has an exterior housing made of plastic. Fob 107 includes an RF read only transponder that carries an identifier, which in one embodiment is the H4102 available from EM Microelectronic-Mahn SA of Switzerland. When fob 107 is placed in proximity to RF ID reader 114, RF ID reader obtains the player identifier from the fob. This player identifier is then utilized as a unique identifier that is coupled to the play on the gaming machine 104.

Each RF enclosure 106 is coupled to a computing device 120 at remote site 102. In one embodiment, each RF enclosure 106 is coupled to computing device 120 using RS485-based connections. In one embodiment, computing device 120 is a PC running Windows 2000 or Windows XP and further includes a 1 Ghz processor, 256 Mb RAM, a 40 MB hard drive, a 56 kB modem, and a RS485-to-RS232 adapter. In one embodiment, computing device 120 further includes a browser such as Internet Explorer 5.0. Nonetheless, some embodiments do not include a browser and do not even require a display with computing device 120. As should be understood, the elements of computing device 120 described are exemplary only and many alternatives will be readily apparent to those of skill in the art. For instance, rather than a Windows-based PC, a MAC, a Linux-base device, a UNIX-based device, or other computing device can be used. As well, a broadband connection or leased line can be used instead of a 56 k modem. Moreover, elements of computing device 120 can also be of differing speeds or sizes in other embodiments. Computing device 120 is sometimes referred to herein as a "Data Control Unit" or "DCU."

DCU 120 will at least periodically establish a connection with a modem bank 122 at central site 100. Modem bank 122 includes a dedicated modem for each remote site 102 (only one remote site is shown). In some embodiments for security purposes, modems at both the central site and remote sites will only accept an incoming call from a pre-assigned phone number (i.e., that of the remote site or central site). Modem bank 122 is coupled to a computing device 124 that receives data from all remote locations and is described in further detail below. Computing device 124, a windows based application, is sometimes referred to herein as a "Poller."

Poller 124 is coupled to hub 126, which in turn is coupled to database 128, which in one embodiment runs Microsoft SQL Server 2000, although other embodiments may run other database software. Hub 126 is further coupled to computing device 130. Computing device 130 is the main administrative interface to the system of FIG. 1 and is therefore sometimes referred to herein as Admin-Manager device 130. In one embodiment, Admin-Manager device 130 is a PC running Windows 2000, although non-Windows PCs or computing devices are also suitable in other embodiments. Although only one device is shown for device 130, in some embodiments, multiple computing devices may be used to carry out its functionality, e.g., one device for administrative functions, one for management functions, and one for data entry. Further coupled to computing device 130 are fob reader 132, barcode printer 134, and barcode wand 136.

Admin-Manager device 130 further includes software modules to support an Administration function, a Management function, and a Reporting function.

The Administration module is used to manage system user access for the central site employees as well as the owners and managers of the various remote locations where the system is deployed. A user-administrator is responsible for setting up new users and user groups as well as removing users, e.g., when an employee leaves the company. Information is stored for each remote site, including address, phone numbers, and contact information.

At least two categories of users are established in one embodiment: owners/managers of remote locations and "bar hosts." par hosts, unless they are also an owner or manager, normally do not have privileges to use any of the system functions and are not granted system access. However, bar hosts are assigned "employee fobs" for the purpose of enrolling new players, as will be described below.

The Management module acts as the primary user interface to the player tracking system. Access privileges to the various functions of the program are granted through the administration module. The management module manages player accounts, including adding, editing, disabling, and deleting accounts. The management module also manages fobs including initializing, verifying, processing, registering, enabling and disabling fobs. The management module further accounts for slot machines at the various remote locations, including adding, deleting, and moving slot machines, provides EFT (Electronic Funds Transfer) meter information for use by other accounting systems, allows game meter information to be viewed for problem resolution, shows transaction histories on various slot machines, and includes system set up parameters.

Figure 4:
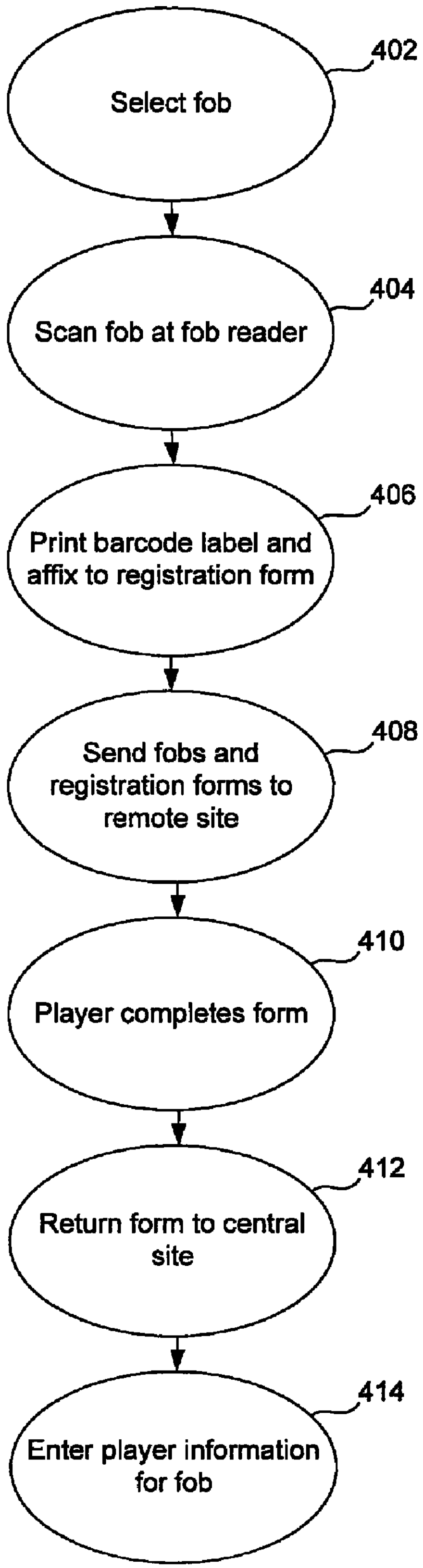
FIG. 4 is a flow diagram showing steps for initializing fobs and associating fobs with a player in an embodiment of the invention.

Fob registration is done using the manager module on device 130, which registration must occur before a fob can be issued to a player. Referring to FIG. 4, to register a fob, first an un-initialized fob is selected, step 402 and is read by a fob reader 132, step 404, which reads in an identifier stored on the fob and stores the identifier. This, in part, ensures that unassigned third party fobs will be rejected from the system in case there is an unauthorized use of the fob. A barcode is created representative of the identifier on the fob, and a barcode label for the fob is printed on printer 134, step 406. The barcode label is attached to a registration form to be filled out by a new player. The fob and the registration form are then stored together, e.g., in a plastic bag: since the barcode identifies the fob, the player must fill in the registration form having the appropriate barcode label on it in order to be associated with the fob. Once initialized, the fobs (along with their associated registration forms) are sent to the remote location(s), step 408. New players who wish to join a gaming establishment's "club" will fill out a registration form, step 410. Once the form is completed, the player will be provided the fob associated with the form. The form is returned to the central site, step 412.

When the central site receives the registration form, it enters the player information using the management module, step 414. In particular, the user enters the information from the form into appropriate fields displayed on the device 130. The program then prompts the user for the barcode on the registration form. The user scans the barcode on the form using wand 136, thereby matching the fob to the user's account. Any play that has been recorded for the player while using the fob before the player information was entered (i.e., anonymously tracked play) at the central site will be associated with the new account and the player will now be able to redeem player points for cash at any game that is connected to the central site (i.e., the recorded play is no longer anonymous).

Figure 5:
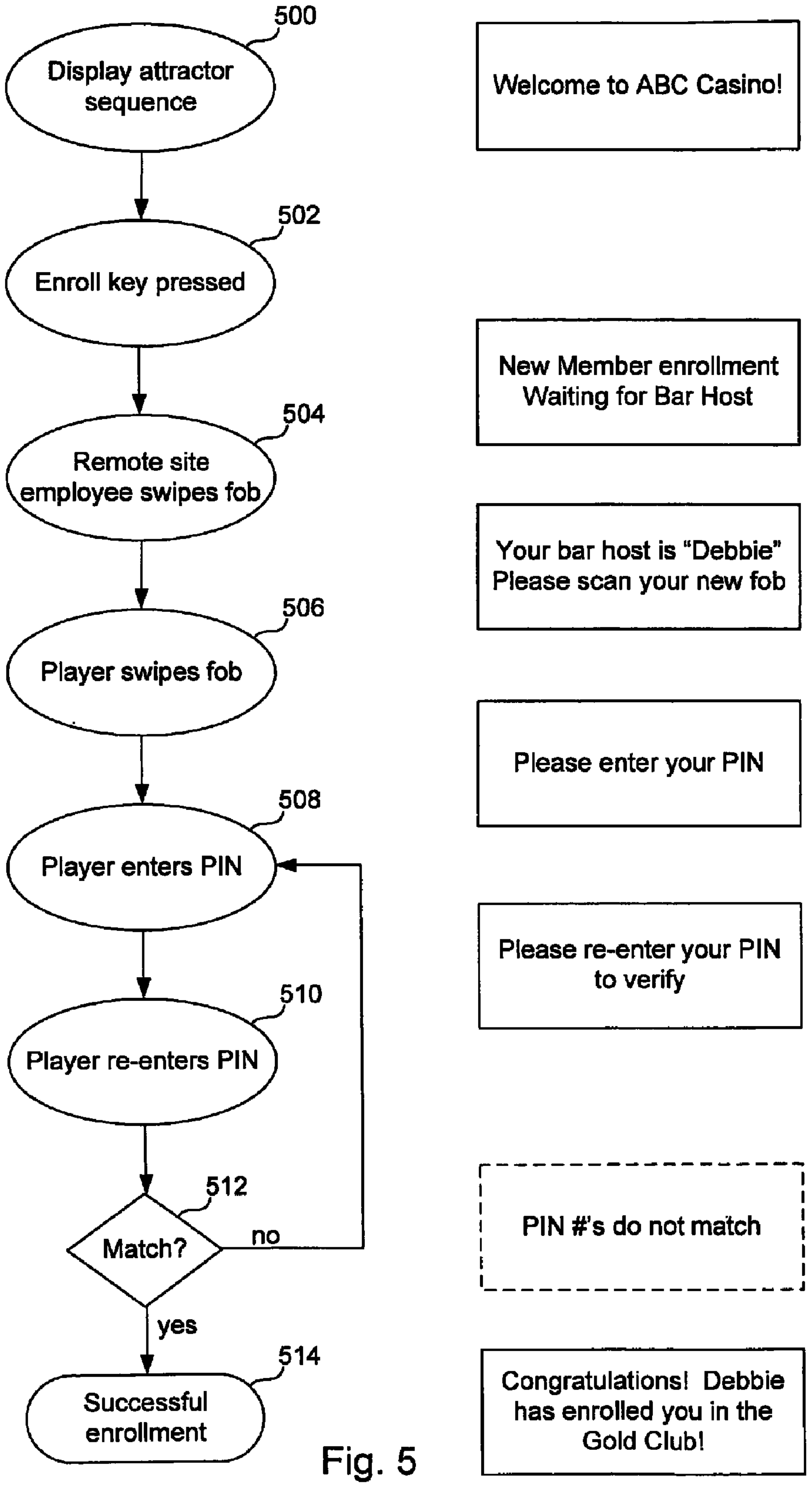
FIG. 5 is a flow diagram showing steps for enrolling players in an embodiment of the invention.

As soon as the player receives the fob at the remote site, the player can begin to use it for accumulating points even though all of his/her specific information has not yet been entered in the database at the central site (i.e., the player may accumulate points and be tracked anonymously). Referring to FIG. 5, to do so, the "enroll" button on a machine is pressed, step 502.

A message is displayed on the display indicating that the bar host needs to swipe his/her fob: "New member enrollment . . . . Waiting for Bar Host." An employee at the remote site will then swipe an "employee fob" across the reader, step 504. A message is then displayed in one embodiment indicating that the player should swipe his/her fob: "Your bar host is 'Debbie' . . . . Please scan your new fob." The player then swipes his/her new fob across the reader, step 506. The player will then be prompted on the display to enter a PIN, at which point the player enters a PIN using the keypad 118, step 508. The player will be prompted to re-enter the PIN for verification, step 510. If the entered and re-entered PINs do not match, step 512, the player is prompted to enter and re-enter his/her PIN again. If the entered and re-entered PINs match, the player has been successfully enrolled, step 514. The player is now ready to accumulate points although the player will not be eligible, in some embodiments, to cash out the points until the player information is entered at the central site. In some embodiments, if at any time during the enrollment process there is more than a 30 second pause between actions, the enrollment process will be discontinued. In some embodiments, if the player or the employee wish to discontinue the process, the "enroll" key is pressed again to stop the process.

Once enrolled, to accumulate points while playing games, the player swipes his/her fob across the area on the reader unit where the RF coil is located, step 602. The identifier is transmitted from the fob to the antenna 112 and RF ID reader 114 and then transmitted from the RF enclosure 106 to the central site through DCU 120, step 604. The central site database is searched using the identifier to find the player's name and point balance, step 606. While the player information is retrieved, the display displays a message such as "Searching for Files." Once the player information is found, the player information in transmitted to the remote site, and a greeting is displayed to the player, e.g., "Hello Nancy! You have 198,340 points". If no player is found, but the fob is valid, then only the player's points are displayed, e.g., "Hello Player! You have 108 points." Player information may not be found if the player has recently enrolled and the player's information has not yet been entered at the central site. Although some embodiments only display the player's point balance other embodiments may display other elements of the player's account, such as whether the player has any comps or comps that are available for redemption.

Once successfully logged in, the player will typically go on to play the game, 610. When finished playing, the player presses the "logout" key on the keypad 118, step 612. The player's session points will be displayed along with a logout message in some embodiments, step 614. In addition, the system will automatically log out the player after a period of inactivity (e.g., 1 minute) or when a new player swipes a fob across the reader. The player's activity for each session from login to logout is recorded at the central site typically in the form of a point or account balance, although additional information can be stored such as the length of time the player played, how much money was wagered, and what game was played.

Figure 6:
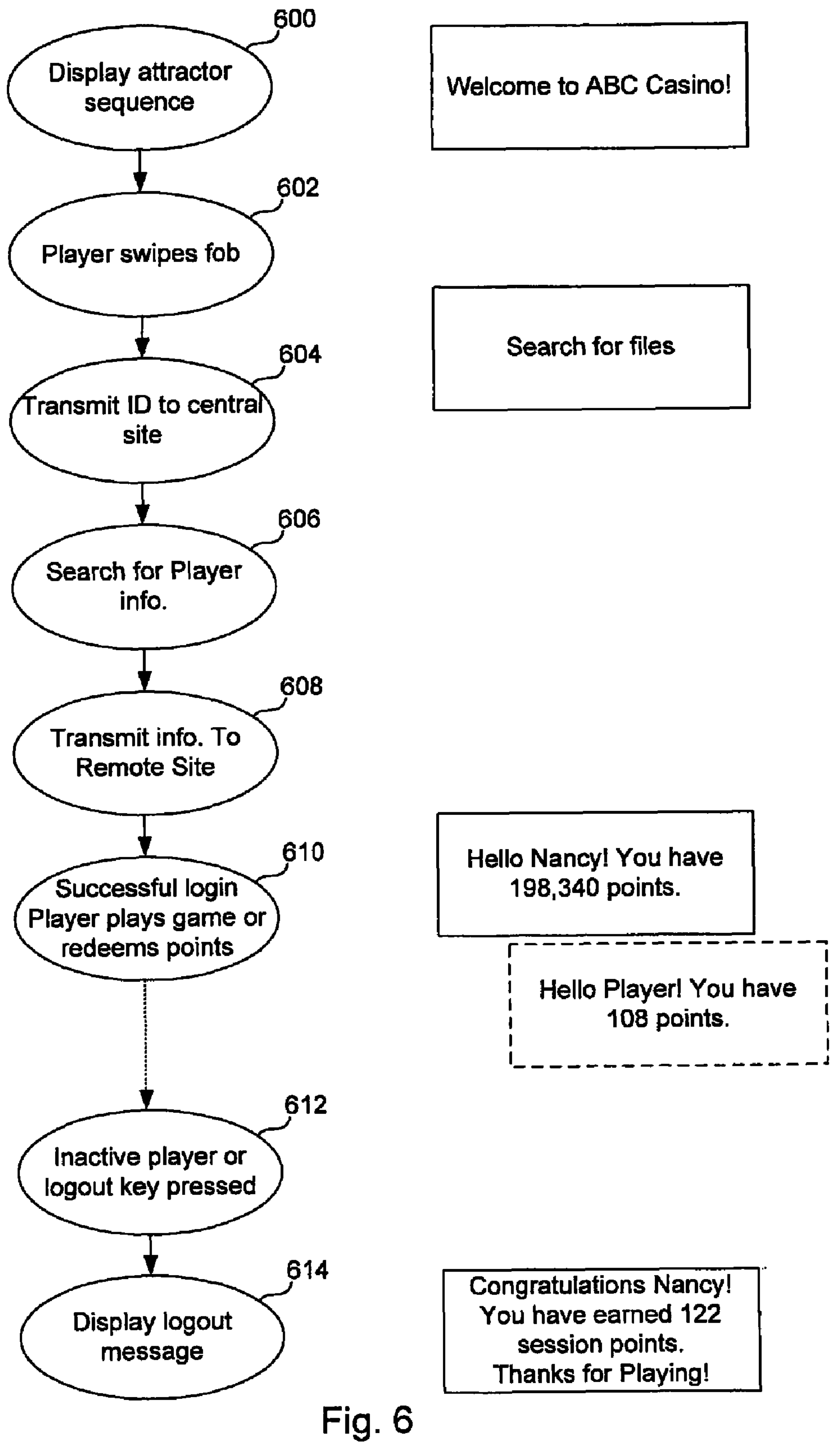
FIG. 6 is a flow diagram showing steps for player login and logout in an embodiment of the invention.

When a player is not playing a game, display 116 displays one or more attract messages, e.g., "Welcome to ABC Casino!," as shown in steps 500 (FIG. 5) and 600 (FIG. 6).

Figure 7:
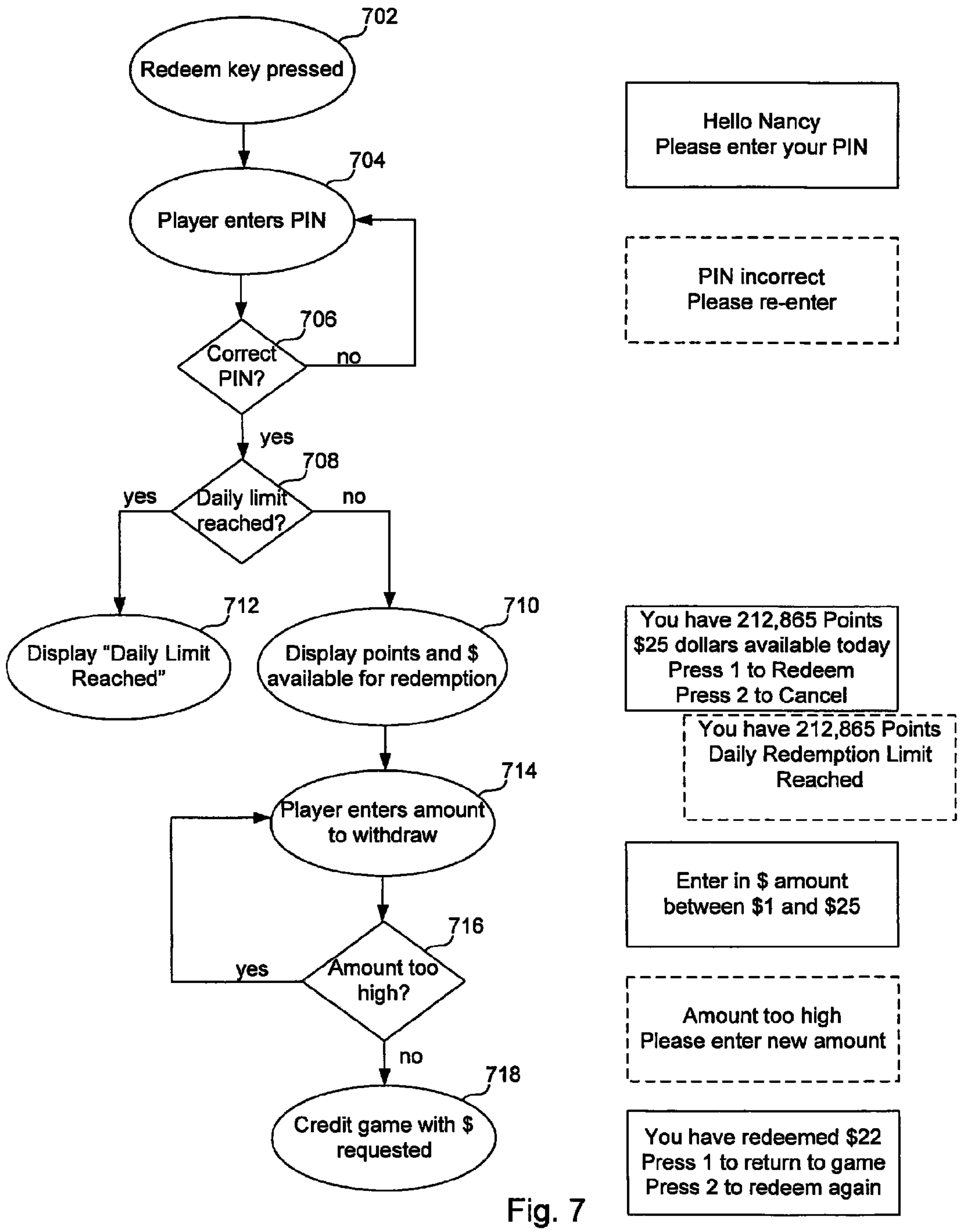
FIG. 7 is a flow diagram showing steps for point redemption in an embodiment of the invention.

After a successful login, the player may choose to redeem points, FIG. 7, and can do so without the assistance of any remote location employees or other third parties. Pressing the "redeem" key on the keypad begins the redemption process, step 702. In order to redeem points, the player will be prompted by the system to enter his/her PIN on the keypad, step 704. Using a PIN provides additional security. The PIN is checked for accuracy, step 706. In some embodiments, there may be a daily limit on the amount that can be redeemed by the player, e.g., $25.00. If there is a daily limit, then in some embodiments the player's account is checked to see if the player has redeemed his/her daily limit, step 708. Some embodiments will not have a daily limit or will have a daily limit set to the total monetary value of the accumulated points. In some embodiments, the player is displayed his/her total points and available balance for redemption, step 710. But if a daily limit for redemption has been reached, the display notifies the player that he/she will be unable to redeem additional points, step 712. If the player has a redemption balance available, the player is prompted to key in a dollar amount to redeem, step 714. If the player has an adequate available balance, the system will credit the electronic funds transfer (EFT) meter in the gaming device for the amount requested, step 718. If the amount keyed in by the player is too high, however, the player will be informed that the amount it too high and asked to enter a new amount, step 716. Once the points are redeemed, the player can then choose to either cash out the credits that have been downloaded to the game by pressing the "cash out" key typically available on slot machines, or the player can simply continue playing the game using the credits that were downloaded.

In addition to an Administration Module and a Management Module, Admin-Management device 130 also includes a Reporting Module in some embodiments. With the reporting module, various reports can be created. Reports can be accessed only by those having privileges to access reports—generally only those users whose job descriptions require access (access privileges are assigned with the Administration Module). Reports are generated at central site 100 since almost all player information is stored in database 128 and not at remote locations. In some embodiments, some reports are available over an internet connection for those users at remote sites, but users will be required to log in and have appropriate privileges to be granted report access. Reports that are able to be generated in one embodiment include:

- user access reports showing access privileges for all users of the system;
- audit reports showing actions taken by users when logged into the system;
- redemption reports on a game-by-game basis;
- slot listing reports showing detailed information about games installed at each remote location, e.g., manufacturer, slot identifier number;
- parameter listing reports showing system parameters usually set up on system installation;
- liability reports showing a summary of outstanding player point values and the cash value of those points;
- meter consistency reports which show if games having meters that are incrementing outside of a reasonable predetermined rate;
- enrollment reports showing the number of newly enrolled players at various remote locations;
- comp detail reports showing the number and average value of comps given to players at selected remote locations;
- redemption detail reports showing point redemptions made at selected remote locations;
- version reports showing modifications and upgrades to the system;
- theoretical win reports showing player activity according to theoretical win per trip per gaming location;
- player history reports showing a detailed history per day for each location for each player;

- card/non-carded reports indicates the amount of coin-in per location that was played by logged-in players versus non-logged players;
- zip code reports shows the amount of coin-in, theoretical win, and actual win that a remote location produces from its enrolled players by zip code; and
- other various reports.

In addition, an embodiment of the invention can generate current player reports showing statistics regarding the activity of each currently logged-in player by location and in real time. These real-time reports are viewable in some embodiments by authorized users at remote locations on an internet connection to the central location.

The remote site and the central site communicate using the poller and the DCU. The poller and the DCU each include software programs that place information into (and take information out of) the communication packets used for communicating between the sites.

Each packet utilizes a series of commands or bytes which are utilized as commands for the receiving application to decipher and by which the receiving application can decode and route or respond based on the deciphered message. “STX” and “ETX” indicate the start and end of a packet. “Destination Address” and “Source Address” indicate the locations the packet is going to and the location that it came from. If a message is to be broadcast to, e.g., all remote locations from the central location the destination address is set to zero. “Category” and “Code” describe the class and category of messages. “Date Time” indicates the date and time the message was sent as is known in the art. “Logical Data Length” is the length of the data field. It is indicated as “logical” because in some embodiments, the physical data length may be different. For instance, in some embodiments, if the data field contains 0x55 or 0xAA, when the message is sent physically, these bytes are duplicated, e.g., if logical data is 0x55 0xAA, then the data physically sent is 0x55 0x55 0×AA 0xAA. The Logical Data Length does not include the duplicated bytes. “Data” contains any data being sent as will be described with the discussion of Categories and Codes.

Finally a CRC (Cyclical Redundancy Check) is used on the packet to further ensure the data send is accurate and not changed while in transit. CRC functions are well known in the art and any CRC function can be used. In one embodiment, however, the following CRC function is used:

```
UINT16 compute_CRC(UINT8*s, UINT32 len, UINT16
crcval)
{UINT32 c;
  UINT32 q;
  UINT32 i;
  for(i=len;i>0:i-){
    c=*s++;
    q=(crcval^c) & 0x0F;
    crcval=(crcval>>4)^(q*0x1081);
    q=(crcval^(c>>4)) & 0x0F;
    crcval=(crcval>>4)^(q*0x1081);}
  return crcval;}
```

The “Category” and “Code” fields of each packet indicate the information that is being conveyed.

Accordingly a system and method have been described that provides a small RF identifying device that can simply be scanned and does not need to be inserted into a reader or otherwise leave the hands of the player. Although slot machines have been discussed as exemplary herein, it is to be understood, that various embodiments of the invention could be applied to other types of stand-alone games as well as gaming tables, and all are generally referred to herein as “gaming devices.” In addition, as should be understood, RF readers may also be established at kiosks, e.g., to check or redeem points, or at pay stations in restaurants, bars, gift shops, or other establishments, where the kiosks and pay stations are for tracking expenditures, accumulating points as a result of expenditures, or for redeeming points and comps. RF readers may also be used at sports wagering kiosks to redeem points for placing sports bets and to allow the accumulation of points when a player places sports bets. Accordingly, gaming devices, kiosks, and pay stations are all referred to generally herein as “interactive devices” and all generally share the characteristic that they are interactive with the player. Moreover, although an embodiment of the system as described herein is for recognizing players in a casino-type gaming environment, other embodiments are contemplated for other environments, including employee time management and building security.

Some advantages of using a fob include lower maintenance cost for the casino as the mechanical card reader is eliminated, greater player satisfaction because the fob is approximately 75% smaller than a magnetic card and can be comfortably attached to a key chain in some embodiments, faster access to player accounts as the player need only swipe the fob across the RF reader without using a key pad to actuate the system, and there is also a lower risk of loss of the fob because, unlike a magnetic card, it is not inserted into a reader for the entire time of play but rather kept on the player’s person.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

We claim:

1. A system for tracking an individual’s wagering activity before and after said individual has provided information identifying themselves, comprising:

(a) a remote site including:

a plurality of interactive devices that each engage an individual in an interactive activity and collect wagering information for the individual during the interactive activity;

a plurality of RF enclosures, wherein each respective enclosure is coupled to a respective interactive device, and wherein each enclosure includes an RF reader and a display;

(b) a plurality of RF transponders, wherein each RF transponder includes a unique identifier; and wherein the RF reader is configured to obtain the unique identifier from one or more of the plurality of RF transponders in proximity to the RF enclosure;

(c) a central site, wherein the central site is in at least periodic communication with the remote site;

the central site including a management module and a database for storing wagering information;

wherein the management module is configured to associate a portable registration form with at least one of the plurality of RF transponders, the registration form comprising one or more open fields labeled to identify requested information and configured to accept insertion of player information including the individual’s name from the individual and a transponder identifier, the transponder identifier configured to identify at least one of the plurality of RF transponders;

wherein the management module is further configured to subsequently receive the player information from the one or more open fields of the registration form and store the player information in the database;

wherein, prior to receiving the player information from the registration form, the database receives and stores the wagering information and the unique identifier of at least one of the plurality of RF transponders from the remote site, the wagering information being stored associated with the unique identifier; and wherein, after receiving the player information from the registration form, the management module stores the player information in the database, the player information being stored associated with previously stored wagering information according to the transponder identifier of the registration form.

2. The system of claim 1, wherein the wagering information includes information regarding an individual in possession of one of the plurality of RF transponders, including a point balance, and wherein the point balance is reflective of the individual's activity at the plurality of interactive devices.

3. The system of claim 1, wherein the wagering information includes information regarding an individual in possession of one of the plurality of RF transponders, including a point balance, and wherein the point balance is an accumulation of points based on the individual's activity at the plurality of interactive devices and awards from an establishment utilizing the system.

4. The system of claim 2, wherein the points have a monetary value and are redeemable only after receiving the player information from the registration form.

5. The system of claim 1, wherein the plurality of interactive devices collect session activity and communicate the session activity to the database for storage associated with the unique identifier of at least one of the plurality of RF transponders, the session activity comprising the time period from the time at least one of the plurality of RF transponders is placed in proximity to the RF reader until a logout event.

6. The system of claim 1, wherein the central site is configured to transmit information to the RF enclosure of at least one of the plurality of interactive machines at the remote site, the information identifying an individual in possession of the respective transponder and a point balance for the individual, wherein the information is displayed to the individual on the display.

7. The system of claim 1, wherein the plurality of interactive devices include gaming devices, kiosks, and pay stations.

8. The system of claim 7, wherein gaming devices include slot machines and gaming tables.

9. The system of claim 1, wherein the RF enclosure further includes a keypad.

10. The system of claim 1, wherein the RF enclosure further includes a keypad and a controller.

11. The system of claim 1, including a plurality of remote sites, wherein the central site is in at least periodic communication with each remote site, and wherein the database stores information accumulated from all of the remote sites.

12. A system for tracking an individual's wagering activity before and after said individual has provided information identifying themselves, comprising:

an interactive device that engages an individual in an interactive activity and collects wagering information of the individual during the interactive activity;

a plurality of RF transponders, wherein each of the plurality of RF transponders include a unique identifier;

an RF enclosure, wherein the enclosure is coupled to the interactive device, and wherein the enclosure includes an RF reader and a display, wherein the RF reader is configured to obtain the unique identifier from the plurality of RF transponders;

a portable registration form for collecting player information from the individual, the registration form comprising one or more open fields labeled to identify requested information and configured to accept insertion of player information including the individual's name and a transponder identifier that identifies at least one of the plurality of RF transponders;

a computing device at a central site remote from the interactive device, the RF enclosure in at least periodic communication with the computing device;

a database coupled to the computing device, the database configured to store the wagering information of the individual, wherein the wagering information is stored associated with the unique identifier of at least one of the plurality of RF transponders; and a management module coupled to the computing device, the management module configured to receive the player information from the registration form and store the player information in the database, wherein the player information is stored associated with previously stored wagering information according to the transponder identifier of the registration.

13. The system of claim 12, wherein the display displays a point balance, the point balance reflective of the individual's activity at the interactive device and other interactive devices.

14. The system of claim 12, wherein the RF enclosure further includes a keypad.

15. The system of claim 14, wherein the display and the keypad are integral.

16. The system of claim 12, wherein the RF enclosure further includes a keypad and a controller.

17. The system of claim 12, wherein the interactive device is one of a gaming device, a kiosk, and a pay station.

18. The system of claim 17, wherein the gaming device is one of a slot machine and a gaming table.

19. A method for tracking an individual's wagering activity before and after said individual has provided information identifying themselves, comprising:

receiving, at an interactive device at a remote site, an RF signal from an RF transponder held by an individual, the signal including a unique identifier identifying the RF transponder;

transmitting the identifier to a computing device at a central site;

tracking activity by the individual until a logout event, wherein information about the activity is stored in a database at the central site associated with the unique identifier of the RF transponder;

providing a registration form comprising a transponder identifier with the RF transponder to the individual, wherein the transponder identifier identifies the RF transponder;

receiving player information including at least the individual's name at one or more open fields of the registration form according to one or more labels of the one or more open fields; and after information about the activity by the individual is stored, storing the player information from the registration form, wherein the player information including the individual's name is stored associated with previously stored information about the activity by the individual in the database according to the transponder identifier of the registration form.

20. The method of claim 19, further comprising:

using the unique identifier of the RF transponder at the central site to retrieve information about the individual, and transmitting, by the central site, the information to the interactive device.

21. The method of claim 20, wherein the information includes a point balance.

22. The method of claim 19, wherein tracking activity by the individual includes accumulating a point balance for the individual reflective of the individual's activity.

23. The method of claim 19, further including:

wherein tracking activity by the individual includes accumulating a point balance for the individual reflective of the individual's activity; and permitting the individual to redeem points in the point balance for cash at the interactive device after information about the activity by the individual is stored.

24. The method of claim 19, further including:

receiving, at the interactive device, an enroll signal;

receiving, at an interactive device, the RF signal from the RF transponder held by the individual, the RF signal including a unique identifier identifying the RF transponder;

prompting the individual to enter a PIN; and transmitting the identifier and PIN to the central site.

25. The method of claim 24, further including:

prior to receiving an RF signal from the RF signal from the RF transponder held by the individual, receiving, at the interactive device, an RF signal from an RF transponder held by an employee, the RF signal including an employee identifier.

26. The method of claim 19, further including:

generating a plurality of reports at the central site relating to activities conducted on a plurality of interactive devices at a plurality of remote sites; and displaying at least one of the plurality of reports to an authorized individual at least one of the remote sites.

27. The method of claim 26, wherein one of the plurality of reports relates to the current activity of a single individual in real time.

28. The method of claim 26, wherein the plurality of reports are displayed to the authorized individual over the internet.

29. A method for tracking an individual's wagering activity before and after said individual has provided information identifying themselves, comprising:

receiving, at any one of a plurality of interactive devices at any one of a plurality remote sites, an RF signal from an RF transponder held by an individual, the signal including unique identifier identifying the RF transponder;

transmitting the identifier to a computing device at a central site;

tracking, by the remote site, activity by the individual at the interactive device until a logout event, wherein information about the activity is stored in a database at the central site associated with the unique identifier of the RF transponder;

providing a registration form comprising a transponder identifier with the RF transponder to the individual, wherein the transponder identifier identifies the RF transponder;

receiving player information including at least the individual's name at one or more open fields of the registration form according to one or more labels of the one or more open fields;

after information about the activity by the individual is stored, storing player information from the registration form, wherein the player information including the individual's name is stored associated with previously stored information about the activity by the individual in the database according to the transponder identifier of the registration form;

generating a plurality of reports at the central site relating to activities conducted on the plurality interactive devices at the plurality remote sites; and displaying a report to an authorized individual at least one of the plurality of remote sites.

30. The method of claim 29, wherein one of the plurality of reports relates to the activity of a single individual.

31. The method of claim 30, wherein the one of the plurality of reports reflects current activity for the single individual in real time.

32. The method of claim 29, wherein one or more of the plurality of reports is displayed to authorized personnel over the internet.

33. A method for tracking an individual's wagering activity before and after said individual has provided information identifying themselves, comprising:

receiving, at an interactive device at a remote site, an enroll signal;

receiving, at the interactive device, an RF signal from an RF transponder held by an individual, the signal including a unique identifier identifying the RF transponder;

prompting the individual to enter a PIN;

transmitting the RF identifier and the PIN to a central site;

collecting activity by the individual at the interactive device until a logout event, wherein information about the activity is stored in a database at a central site associated with the unique identifier of the RF transponder;

providing a registration form comprising a transponder identifier with the RF transponder to the player, wherein the transponder identifier identifies the RF transponder;

receiving player information including the individual's name at one or more open fields of the registration form according to one or more labels of the one or more open fields; and after information about the activity by the individual is stored, storing player information from the registration form, wherein the player information including the individual's name is stored associated with previously stored information about the activity by the individual in the database according to the transponder identifier of the registration form.

34. The method of claim 33, further including:

prior to receiving an RE signal from a transponder held by an individual, receiving, at the interactive device, an RF signal from an RF transponder held by an employee, the RF signal including an employee identifier.

35. A method for tracking an individual's wagering activity before and after said individual has provided information identifying themselves, comprising:

receiving, at an interactive device at a remote site, an RF signal from an RF transponder held by an individual, the signal including a unique identifier identifying the RF transponder;

collecting information comprising a point balance for the individual at the interactive device until a logout event, wherein the information is stored associated with the unique identifier of the RF transponder in a database at a central site;

transmitting the unique identifier to the central site;

using the unique identifier at the central site to retrieve the information comprising a point balance for the individual;

transmitting, by the central site, the information to the interactive device;

displaying, by the interactive device, the point balance;

permitting the individual to redeem points in the point balance for cash at the interactive device without assistance of other persons;

providing a registration form comprising a transponder identifier to the player, the transponder identifier identifying the RF transponder;

associating, by a management module of the central site, the registration form with the RF transponder;

receiving player information including the individual's name at one or more open fields of the registration form according to one or more labels of the one or more open fields; and after the information comprising a point balance for the individual is stored, storing, by the management module, player information from the registration form, wherein the player information including the individual's name is stored associated with previously stored information comprising the point balance for the individual in the database according to the transponder identifier of the registration form.

* * * * *